(12) United States Patent
Girault

(10) Patent No.: US 9,225,467 B2
(45) Date of Patent: Dec. 29, 2015

(54) METHOD FOR CALIBRATING THRESHOLDS AND THRESHOLD CALIBRATION MODULE FOR A SATELLITE TELECOMMUNICATIONS SYSTEM

(75) Inventor: Nicolas Girault, Toulouse (FR)

(73) Assignee: AIRBUS DEFENCE AND SPACE SAS, Les Mureaux (FR)

(*) Notice: Subject to any disclaimer, the term of this patent is extended or adjusted under 35 U.S.C. 154(b) by 406 days.

(21) Appl. No.: 13/512,457

(22) PCT Filed: Nov. 30, 2010

(86) PCT No.: PCT/EP2010/068551
§ 371 (c)(1),
(2), (4) Date: Jul. 24, 2012

(87) PCT Pub. No.: WO2011/064397
PCT Pub. Date: Jun. 3, 2011

(65) Prior Publication Data
US 2012/0287802 A1 Nov. 15, 2012

(30) Foreign Application Priority Data
Nov. 30, 2009 (FR) ...................................... 09 58475

(51) Int. Cl.
*H04J 1/16* (2006.01)
*H04L 1/00* (2006.01)

(52) U.S. Cl.
CPC ............. *H04L 1/0021* (2013.01); *H04L 1/0003* (2013.01); *H04L 1/0009* (2013.01)

(58) Field of Classification Search
CPC ....................................................... H04L 47/10
USPC ............................ 370/252, 315, 335; 714/759
See application file for complete search history.

(56) References Cited

U.S. PATENT DOCUMENTS

2001/0043574 A1* 11/2001 Nguyen et al. ................ 370/316
2002/0056066 A1* 5/2002 Gesbert et al. ................ 714/759
(Continued)

FOREIGN PATENT DOCUMENTS

EP 1 259 015 A2 11/2002
WO 02/25853 A2 3/2002
WO 2008/018761 A2 2/2008

OTHER PUBLICATIONS

Clive Tang Ed—Institute of Electrical and Electronics Engineers: "An intelligent learning scheme for adaptive modulation", IEEE 54th Vehicular Technology Conference. VTC Fall 2001. Proceedings Oct. 7-11, 2001 Atlantic City, NJ, USA; [IEEE Vehicular Technolgy Conference], IEEE 54th Vehicular Technology Conference. VTC Fall 2001. Proceedings (Cat. No. 01CH37211) IEEE Piscata, vol. 1, Oct. 7, 2001, pp. 144-148, XP010562662, ISBN: 978-0-7803-7005-0.

(Continued)

*Primary Examiner* — Gregory Sefcheck
*Assistant Examiner* — Jael Ulysse
(74) *Attorney, Agent, or Firm* — Young & Thompson

(57) ABSTRACT

A method for calibrating a threshold for selecting a transmission format, from a plurality of transmission formats, in order to exchange data packets over a radio-frequency propagation channel, referred to as the "channel" ($L_1$, $L_2$, $L_3$) between a transmitting device and a receiving device of a satellite telecommunications system, includes: calculating a calibration table for the threshold, which associates transmission statistics, representative of an amount of estimated errors for a plurality of data packets received by the receiving device, with a plurality of values of the instantaneous channel quality; and updating the threshold, which, according to the calibration table, is a value of the instantaneous channel quality enabling a predefined value of the transmission statistics to be provided. A threshold calibration module, which can be included in a terrestrial terminal (2), and/or a satellite (3), and/or, more generally, in a satellite telecommunications system, is also described.

14 Claims, 2 Drawing Sheets

(56) References Cited

U.S. PATENT DOCUMENTS

| | | | |
|---|---|---|---|
| 2003/0027529 A1* | 2/2003 | Haugli et al. | 455/67.1 |
| 2004/0240578 A1* | 12/2004 | Thesling | 375/285 |
| 2004/0264372 A1* | 12/2004 | Huang | 370/230 |
| 2005/0031044 A1* | 2/2005 | Gesbert et al. | 375/259 |
| 2007/0110002 A1* | 5/2007 | Yang et al. | 370/335 |
| 2007/0160122 A1* | 7/2007 | Yoshida | 375/219 |
| 2007/0167132 A1* | 7/2007 | Wahlberg et al. | 455/11.1 |
| 2009/0303916 A1* | 12/2009 | Winkler et al. | 370/315 |
| 2010/0318861 A1* | 12/2010 | Gesbert et al. | 714/704 |

OTHER PUBLICATIONS

International Search Report, dated Dec. 30, 2010, from corresponding PCT application.

* cited by examiner

METHOD FOR CALIBRATING THRESHOLDS AND THRESHOLD CALIBRATION MODULE FOR A SATELLITE TELECOMMUNICATIONS SYSTEM

This invention relates to the field of telecommunications, and concerns satellite telecommunications systems allowing data to be transmitted according to a plurality of transmission formats.

More specifically, this invention concerns a method of calibrating a threshold for selecting a data transmission format and a threshold calibration module for this selection.

BACKGROUND OF THE INVENTION

"Transmission format" means a set of parameters determining the formatting of data transmitted over a radio-frequency propagation channel, referred to as the "channel", between a transmitting device and a receiving device of a satellite telecommunications system, for example a channel between a satellite and a terrestrial terminal.

Said parameters are generally a modulation type and a channel coding rate; each transmission format generally corresponds to a specific data rate.

As an example, the specifications of the DVB-S2 ("Digital Video Broadcast—Satellite—Second Generation") standard provide for four different modulation types (QPSK, 8PSK, 16APSK and 32APSK) and eleven different coding rates (from $\frac{1}{4}$ to $\frac{9}{10}$), generating twenty-eight different transmission formats.

The advantage of having several possible transmission formats lies in the possibility of adapting the transmission format to the instantaneous channel quality of each terrestrial terminal. "Instantaneous channel quality" means the channel quality as perceived at the scale of the duration of a data packet (in the millisecond range in the case of a DVB-S2 satellite telecommunications system).

A terrestrial terminal that has a good quality channel may be assigned a transmission format corresponding to a high data rate, whereas a terrestrial terminal that has a poor quality channel will be assigned a transmission format corresponding to a lower data rate.

Generally, a transmission format is selected by comparing the estimated value of the instantaneous channel quality to predefined thresholds, representing theoretical values of the instantaneous channel quality required for using different transmission formats.

The thresholds are static, fixed beforehand by the telecommunications system operator, and determined so as to theoretically ensure, for each transmission format, that an error rate in the data received is below a maximum tolerated error rate. In addition, it is common to provide margins between the selected thresholds and the theoretical values of the instantaneous quality of the propagation channel for which the maximum error rates are obtained, so as to protect against any inaccuracies in the estimated value of the instantaneous channel quality, related to the inaccuracy of the estimator considered, variations in the channel, etc.

The utilization of such static thresholds presents drawbacks.

Firstly, the static thresholds are the same for all terrestrial terminals, and do not take into account the special features of the various channels between the satellite and each terrestrial terminal. As a result significant margins are introduced, so that the bandwidth between the satellite and the terrestrial terminals is largely under-used.

In addition, the static thresholds do not allow the changes over time in the various channels to be taken into account. In particular, the time period, referred to as the "loop time", between the point in time when the instantaneous channel quality is estimated and the point in time when the transmission format, selected on the basis of said estimated value, will actually be applied and presented to the receiver, can vary in practice between 0.5 seconds and 5 seconds in a satellite telecommunications system such as DVB-S2, where the satellites are stationed in a geostationary orbit (GEO). It should be noted that the value of 0.5 seconds corresponds to an absolute minimum value for the loop time, induced by the propagation times for signals between the Earth and a satellite in a GEO orbit.

Variations in the instantaneous channel quality can occur during the loop time, and the selected transmission format may no longer be suitable. The variations in the channel are all the more significant when high frequency bands are used, e.g. Ka, Q, V, etc. bands.

In the context of satellite telecommunications system, it is known from European patent application EP 2061167 to periodically transmit a learning sequence for each available transmission format, check which learning sequences have been correctly demodulated/decoded and select, for transmitting user data packets, a transmission format for which the corresponding learning sequence has been correctly demodulated/decoded.

This method has the disadvantage of reducing the bandwidth available for transmitting user data, because of the need to periodically transmit learning sequences for each transmission format available (a learning sequence corresponding to data known beforehand by the satellite and the terrestrial terminal). In addition, this method does not take into account possible variations in the instantaneous channel quality, related in particular to the loop time needed to apply the selected transmission format.

SUMMARY OF THE INVENTION

This invention aims to provide a solution that permits the thresholds to be adapted to the special features of each channel, and preferably to determine thresholds taking into account the variations in each channel during the loop time.

This invention also aims to provide a solution in which some modes of implementation can be implemented with few or no changes to current satellite telecommunications standards, in particular the DVB-S2 standard.

This invention relates to a method for calibrating a threshold for selecting a transmission format, from a plurality of transmission formats, in order to exchange data packets over a radio-frequency propagation channel, referred to as the "channel", between a transmitting device and a receiving device of a satellite telecommunications system. The threshold calibration method comprises:

a step of calculating a table for calibrating the threshold:
based on estimated errors for data packets received by the receiving device and using the transmission format associated with the threshold to be calibrated, and
based on values of the instantaneous channel quality estimated during reception of said data packets,
said calibration table associating transmission statistics, representative of an amount of estimated errors for a plurality of data packets previously received by the receiving device, with a plurality of values of the instantaneous channel quality, and a step of updating the threshold, which, according to the calibration table, is a value of the instantaneous channel quality enabling a predefined value of the transmission statistics to be provided.

In updating a threshold, associated to a receiving device, according to a calibration table calculated based on signals received by said receiving device, it is understood that this threshold will be determined by taking reception conditions specific to said receiving device into account.

Preferably, the transmission statistics are anticipated transmission statistics. An anticipated transmission statistic, associated to a given value of the instantaneous channel quality, is a transmission statistic calculated for data packets received, relative to a point in time when said given value of the instantaneous channel quality was estimated, after expiry of an anticipation period representative of the loop time. It is understood that the calculation of anticipated transmission statistics allows the fact that establishing a transmission format is not instantaneous, especially in satellite telecommunications systems, to be integrated into the threshold update.

According to a first mode of calculating anticipated transmission statistics, the calculation step comprises:
  a sub-step of time-shifting estimated values of the instantaneous channel quality so as to associate said estimated values of the channel quality to data packets received, relative to the points in time when said values of the instantaneous channel quality were estimated, after expiry of the anticipation period,
  a sub-step of calculating anticipated transmission statistics based on estimated errors for data packets associated to said time-shifted values of the instantaneous channel quality.

According to a second mode of calculating anticipated transmission statistics, the calculation step comprises substeps:
  of calculating at least one instantaneous channel quality variation model, based on estimated values of the instantaneous channel quality,
  of calculating instantaneous transmission statistics based on estimated errors for data packets received by the receiving device; an anticipated transmission statistic, associated to a given value of the instantaneous channel quality, is a statistic calculated for received data packets for which said given value of the instantaneous channel quality has been estimated,
  of calculating anticipated transmission statistics by combining at least one instantaneous channel quality variation model and instantaneous transmission statistics.

According to particular modes of implementing the calibration method, it comprises one or more of the following characteristics, singly or in any technically possible combination:
  the transmission statistics calculation includes a forgetting factor, so as to favor errors estimated for the last data packets received by the receiving device,
  the data packets received, on the basis of which the transmission statistics are calculated, correspond to user data, and/or learning sequences known by the receiving device; learning sequences are transmitted when a bandwidth available for the transmitting device is underused,
  the data packets received by the receiving device, on the basis of which the transmission statistics are calculated, comprise data packets going to other receiving devices.
  where there are several receiving devices, thresholds are updated independently for each of said receiving devices, by calculating at least one calibration table per receiving device based on data packets received by that receiving device,
  during the update step, two thresholds associated with the selection of the same transmission format are updated, a first threshold to be utilized when the estimated value of the channel quality increases, and a second threshold to be utilized when the estimated value of the channel quality decreases.

This invention also relates to a module for calibrating a threshold for selecting a transmission format, from a plurality of transmission formats, for exchanging data packets between a transmitting device and a receiving device of a satellite telecommunications system. Said module comprises:
  means of calculating a calibration table for the threshold:
    based on estimated errors for data packets received by the receiving device and using the transmission format associated with the threshold to be calibrated, and
    based on values of the instantaneous channel quality estimated during reception of said data packets,
  said calibration table associating transmission statistics, representative of an amount of estimated errors for a plurality of data packets previously received by the receiving device, with a plurality of values of the instantaneous channel quality,
  and means of updating the threshold, which, according to the calibration table, is a value of the instantaneous channel quality enabling a predefined value of the transmission statistics to be provided.

Preferably, the transmission statistics calculated are anticipated transmission statistics.

Preferably, the calibration module comprises means of estimating errors in data packets received by the receiving device, and means of estimating the instantaneous channel quality.

Preferably, the calibration module comprises a non-volatile memory in which a history, determined according to the data packets received previously, is stored; the history is designed to allow the calibration table to be calculated taking said data packets previously received by the receiving device into account.

This invention also relates to an item of equipment of a satellite telecommunications system, comprising a threshold calibration module according to the invention. The item of equipment is a terrestrial terminal, a satellite or a ground station.

This invention also relates to a satellite telecommunications system, said system comprising at least one threshold calibration module that is embedded in one of the above-mentioned items of equipment, or distributed between two of said items of equipment.

BRIEF DESCRIPTION OF THE DRAWINGS

The following description of the invention is made with reference to the figures, in which identical references denote identical or similar elements, showing, in a non-limiting way.

DETAILED DESCRIPTION OF THE PREFERRED EMBODIMENTS

This invention relates to a method for calibrating a threshold for selecting a data transmission format, from a plurality of transmission formats, in order to exchange data packets over a radio-frequency propagation channel, referred to as the "channel", between a transmitting device and a receiving device of a satellite telecommunications system.

As explained above, "transmission format" means one or more parameters determining the formatting of data transmitted over the channel. These parameters are, for example, a modulation type and/or a channel coding rate. Other parameters can also be considered for defining a transmission format, such as, for example, the channel coding type if several channel coding types are available (convolutional code, turbo-code, LDPC code, etc.), the transmission power, the symbol rate, etc.

Figure 1:
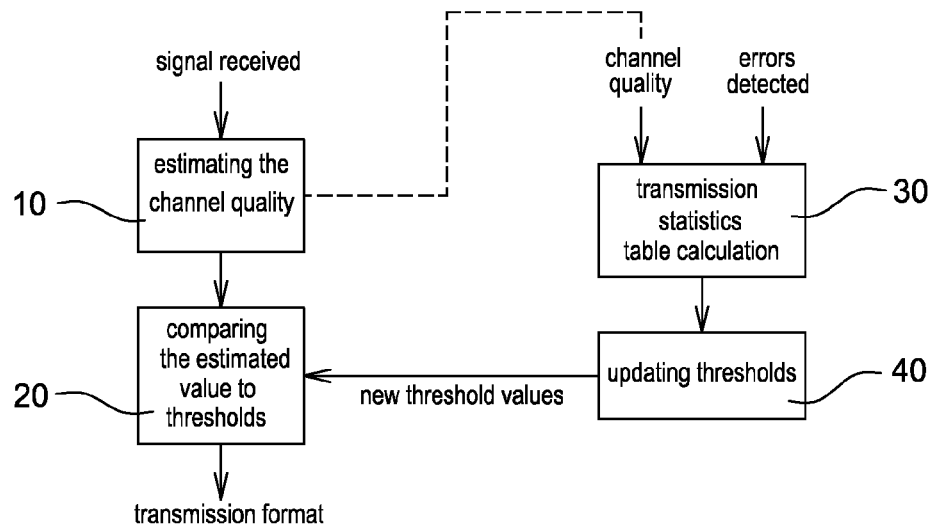
FIG. 1: a diagram illustrating schematically the different steps of a selection method and a calibration method for thresholds according to the invention.

As shown in FIG. 1, a method for selecting a transmission format comprises two steps, 10 and 20: a step 10 of estimating the instantaneous quality of the channel between the transmitting device and the receiving device, and a step 20 of selecting a transmission format to be used by comparing the estimated value of the instantaneous channel quality to thresholds. Each threshold corresponds to a theoretical value of the instantaneous channel quality required to use one of the transmission formats available for transmitting data packets from the transmitting device to the receiving device.

"Instantaneous channel quality" means a short-term estimation of the channel quality, representative of the quality at a given point in time. Such a short-term estimate can use the signal received by the receiving device over a time window of duration δt representative of the duration of a data packet, which is in the millisecond range for a DVB-S2 satellite telecommunications system.

Different representations of the instantaneous channel quality are possible, and a specific representation choice is only an implementation variant of the invention. For example, the instantaneous channel quality can be represented in the form of a signal-to-noise ratio, a signal-to-noise-plus-interference ratio, the power of the received signal, a channel capacity (in the information theory sense), or any other representation known to the expert.

The instantaneous channel quality is estimated from the signal received by the receiving device, and can utilize any method for estimating the instantaneous channel quality known to the expert. The instantaneous channel quality can be estimated based on data packets received by the receiving device, the power spectral density of the signal received by the receiving device, etc.

As shown in FIG. 1, a method for calibrating thresholds according to the invention comprises the following steps 30 and 40:

30 of calculating a threshold calibration table:
      based on estimated errors for data packets received by the receiving device and using the transmission format associated with the threshold to be calibrated, and based on values of the instantaneous channel quality estimated during reception of said data packets,
      said calibration table associating transmission statistics, representative of an amount of estimated errors for a plurality of data packets received by the receiving device, with a plurality of values of the instantaneous channel quality,
   40 of updating the threshold, which, according to the calibration table, is a value of the instantaneous channel quality enabling a predefined value of the transmission statistics to be provided.

It should be noted that FIG. 1 represents the different steps of the selection method and the calibration method in a very schematic way. Notably, FIG. 1 does not give information about the relative duration of the different steps with respect to each other. In particular, steps 10 and 20 of the selection method are steps that are executed each time a transmission format must be selected. Steps 30 and 40 of the calibration method are steps executed over the longer term. More specifically, calculation step 30 is a step that needs information to be collected from a plurality of data packets received previously by the receiving device in order to calculate the calibration table (also referred to below as the "transmission statistics table").

Preferably, each transmission format's thresholds are updated during step 40, and a table of transmission statistics for each transmission format is calculated during step 30.

It should be noted that thresholds are not necessarily associated with all transmission formats. In particular, one of the transmission formats, generally the one corresponding to the lowest data rate, can be used as a default without a threshold being assigned to it. "Each transmission format" therefore means each transmission format that has at least one threshold associated to it.

Preferably, different thresholds are defined for each receiving device with which the transmitting device exchanges data packets. The thresholds defined for a given receiving device are calculated based on the signals received by said given receiving device.

It is therefore understood that, by using the data packets received by a receiving device to calibrate the thresholds associated with this receiving device, it will be possible to adapt the thresholds to the special features of the channel between the transmitting device and the receiving device.

"Transmission statistics" mean statistics representative of an amount of estimated errors for a plurality of data packets received by the receiving device, i.e. representative of an amount of data received with errors or, in an equivalent way, an amount of data received without errors.

The data packets are formatted according to the transmission format selected, i.e. encoded with the selected channel coding rate and modulated with the selected modulation type. The data received are demodulated/decoded at the receiving device. The errors correspond to differences between the data packets received by the receiving device and the data packets actually transmitted by the transmitting device.

In the context of the invention, "packet" is understood generally to be any group of data transmitted over the channel. These are, for example, "frames" in the context of DVB-S2, "cells" in the context of an ATM ("Asynchronous Transfer Mode") network, etc.

Means of estimating errors are utilized for calculating a transmission statistics table.

The data exchanged are generally presented in the form of binary information, referred to as "bits". The estimated errors are preferably bit errors or packet errors (a packet is considered erroneous when at least one bit received is erroneous).

When the data packets are learning sequences, estimating erroneous bits and erroneous packets with respect to the receiving device is simple, insofar as the learning sequences are known beforehand by said receiving device. The receiving device can, for example, compare the received learning sequence, after demodulation and decoding, to the learning sequence theoretically transmitted, preferably stored in a non-volatile memory of said receiving device.

In the case of data corresponding to user data, not known beforehand by the receiving device, erroneous bits and erroneous packets can be estimated according to any known method.

In particular, it is known to the expert that a channel decoder can determine, with great accuracy, whether errors remain after channel decoding. For example, when a Reed- Solomon or BCH type of channel coding is used a syndrome can be calculated, on the basis of which it is possible to determine if there are any errors or not, and if these errors can be corrected (i.e. in the decoder's correction capacity). Thus, the channel decoder can estimate the number of bits comprising errors, and/or estimate whether the data packet after channel decoding is erroneous.

Means of estimating the instantaneous channel quality must be utilized for calculating a transmission statistics table. Any method of estimating the instantaneous channel quality known to the expert can be utilized. It should be noted that the instantaneous channel quality can be estimated based on data packets (e.g. those used for calculating the transmission statistics), the power spectral density of the signal received by the receiving device, etc. Preferably, the means of estimating the instantaneous channel quality, utilized for calculating a transmission statistics table, are the same means as those utilized in step 10 (shown by a dashed line in FIG. 1).

Preferably, the transmission statistics are calculated during step 30 from data packets corresponding to user data. Such provisions have the advantage of not reducing the bandwidth available at the transmitting device through the transmission of learning sequences (as is the case in the prior state of the art). In addition, by using data packets corresponding to user data, the invention can be applied to DVB-S2 telecommunications systems without the need to change the DVB-S2 specifications (in contrast, using learning sequences requires said learning sequences to be defined in the DVB-S2 specifications, for the sake of interoperability between different transmitting and receiving devices).

It is also possible for a receiving device to use the received data packets transmitted to other receiving devices, so as to speed up the calculation of the transmission statistics table.

However, nothing precludes the use of learning sequences for calculating the transmission statistics. In effect the bandwidth available can be under-used, for example because there are not many receiving devices exchanging data packets with the transmitting device. In that case, learning sequences can advantageously be transmitted, in addition to data packets corresponding to user data, by using the unused bandwidth. The number of data packets received is increased by sending learning sequences, which can speed up the calculation of transmission statistics tables.

In a preferred mode of implementation, the transmission statistics are "anticipated" transmission statistics.

An anticipated transmission statistic, associated to a given value of the instantaneous channel quality, is calculated for data packets received, relative to a point in time when said given value of the instantaneous channel quality was estimated, after expiry of a non-zero period, referred to as "anticipation period $\Delta t$". In other words, an anticipated transmission statistics table for a transmission format associates an estimated value of the instantaneous channel quality at a point in time t with an expected transmission statistic for data packets, using said transmission format, that will be received at point in time (t+$\Delta t$).

The anticipation period $\Delta t$ is preferably substantially equal to the loop time, which, in a DVB-S2 satellite telecommunications system, is substantially greater than the duration $\delta t$ considered for estimating the instantaneous channel quality (representative of the duration of a data packet, in the millisecond range). As previously described, the loop time corresponds to the period for establishing the transmission format selected relative to the point in time when the instantaneous channel quality was estimated (during step 10). The loop time is determined by utilizing methods known to the expert.

The loop time can vary, from one DVB-S2 system to the next, between approximately 0.5 seconds and 5 seconds, because different system parameters have been used. Within the same DVB-S2 system, the loop period is not fixed and can vary in a more reduced time frame. In such a case, where the loop time is not fixed, the anticipation period $\Delta t$ is, for example, fixed as substantially equal to the maximum loop time or to an average loop time.

For a given receiving device, the anticipated transmission statistics are calculated based on data packets previously exchanged between the transmitting device and this receiving device.

It is understood that knowledge of anticipated transmission statistics allows the variations in the instantaneous channel quality during the loop time to be taken into account, and thus allows thresholds to be determined that are suitable for selecting transmission formats that will only be applied after expiry of the loop time.

It should be noted that, according to other examples, "instantaneous" transmission statistics are determined, i.e. by directly calculating the transmission statistics for data packets received at substantially the same point in time as the associated instantaneous channel quality was estimated. In contrast to the case of anticipated transmission statistics, this is equivalent to considering a period that is substantially zero.

Using instantaneous transmission statistics notably has the advantage, with respect to the state of the art, of allowing reception conditions for each receiving device to be taken into account.

Using anticipated transmission statistics forms a preferred mode of implementation that, as has been seen, allows the loop time inherent in the satellite telecommunications system to be taken into account. The loop time of a system such as DVB-S2 is much greater than the loop times noted in terrestrial telecommunications systems, due in particular to propagation times being much longer (the satellites being stationed in a GEO orbit).

Figure 2A:
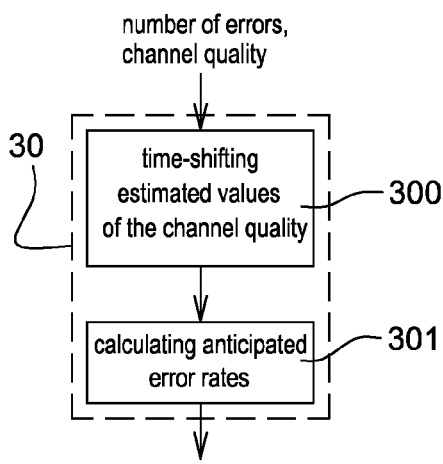
FIGS. 2a and 2b: diagrams illustrating schematically the calculation of anticipated error rates according to two preferred modes of implementation of the invention.
Figure 2B:
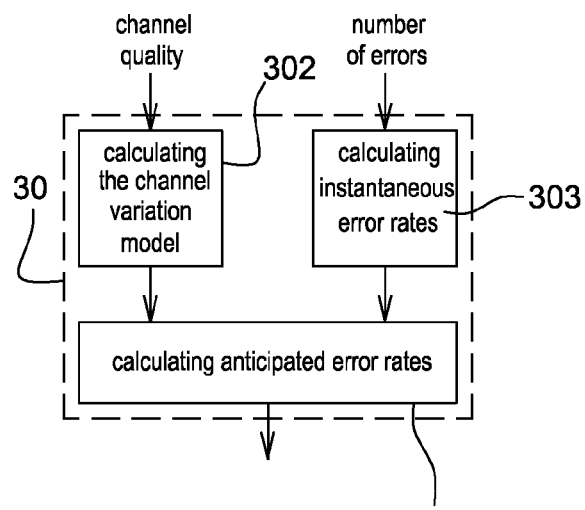

FIGS. 2a and 2b represent two particular modes of implementation of step 30 for calculating the anticipated transmission statistics table. These modes are described in considering the non-limiting example where the transmission statistics calculated are error rates, e.g. a bit error rate or a packet error rate.

A bit error rate (or "BER") corresponds to the ratio of the number of erroneous bits to the total number of bits received, averaged over a plurality of data packets. The bit error rate corresponds to an estimate of the probability that a transmitted bit is received erroneously.

A packet error rate (or "PER") corresponds to the ratio of the number of erroneous packets to the total number of packets received, averaged over a plurality of data packets. The packet error rate corresponds to an estimate of the probability that a transmitted packet is received erroneously.

For purposes of the clarity of the description of FIGS. 2a and 2b, the updating of a single threshold, associated to a transmission format designated by $F_0$, and the calculation of the table of anticipated error rates, associated to said transmission format, are considered. For updating a plurality of thresholds, the same process should be followed for each of said associated transmission formats.

The following notations are used in the rest of the description:
    c(t) designates the value of the instantaneous channel quality, estimated for a data packet received at a point in time t,
    f(t) designates the transmission format used for the data packet received at point in time t, e(t) designates the estimated number of errors for the data packet received at point in time t.

FIG. 2a represents a first preferred mode of implementation of step 30 of calculating the table of anticipated error rates, associated to transmission format $F_0$, in which the anticipated error rates are calculated by time-shifting the estimated values of the instantaneous channel quality relative to the data packets received.

As represented in FIG. 2a, according to this mode of implementation step 30 comprises sub-steps:
- 300 of time-shifting estimated values of the instantaneous channel quality,
- 301 of calculating anticipated error rates.

During time-shifting step 300, the estimated values of the instantaneous channel quality, estimated for data packets received by the receiving device, are retarded so as to associate said estimated values of the channel quality to data packets received, relative to the point in time said values of the instantaneous channel quality were estimated, after expiry of the anticipation period. In other words, a value of the instantaneous channel quality, estimated for a first data packet received by the receiving device, is associated to the number of errors and the transmission format of a second data packet received, relative to said first data packet, after expiry of the loop time.

Thus, for a second data packet received at a point in time t, one has the following information:
- e(t): the estimated number of errors for said second packet,
- f(t): the transmission format used for said second packet,
- c(t−Δt): the estimated value, referred to as the "previous value", of the instantaneous channel quality for the first data packet.

For updating the threshold associated to transmission format $F_0$, only the second data packets whose transmission format f(t) is equal to $F_0$ are considered. It should be noted that the transmission format of the first data packets can be other than $F_0$.

During sub-step 301 of calculating anticipated error rates, cumulative counters are incremented for the number of data packets received and the estimated number of errors for said packets.

Preferably, there are different counters for each value of the instantaneous channel quality for which the calculation of an anticipated error rate is sought. For example, for transmission format $F_0$ and value $C_0$ of the instantaneous channel quality, counters designated by $D(F_0,C_0)$, for the number of packets received, and $E(F_0,C_0)$, for the number of estimated errors, are incremented.

In the case of a data packet error rate calculation: if a data packet, received at a point in time t, is formatted according to transmission format $F_0$, and the previous value c(t−Δt) of the instantaneous channel quality is substantially equal to $C_0$, counters $D(F_0,C_0)$ and $E(F_0,C_0)$ are incremented as follows:

$$D(F_0,C_0)=D(F_0,C_0)+1,$$

$$E(F_0,C_0)=E(F_0,C_0)+e(t).$$

where e(t) has the value 0 or 1 depending on whether the packet was received correctly or is erroneous.

In the case of a bit error rate calculation, the above equations become:

$$D(F_0,C_0)=D(F_0,C_0)+n(t),$$

$$E(F_0,C_0)=E(F_0,C_0)+e(t),$$

where e(t) can take all the values between 0 and the number n(t) of bits that the data packet in question comprises; the number n(t) of bits per packet can vary from one packet to the next.

In the case of a bit error rate calculation, a counter of the squared number of errors, designated by $EE(F_0,C_0)$, can be incremented in order to also estimate the standard deviation for the number of errors, which can be taken into account in particular in the form of a margin when the threshold is updated. Counter $EE(F_0,C_0)$ is, for example, incremented as follows:

$$EE(F_0,C_0)=EE(F_0,C_0)+e^2(t).$$

The anticipated error rate for a value $C_0$ of the instantaneous channel quality and transmission format $F_0$, designated by $p_A(F_0,C_0)$, can be expressed in the form:

$$p_A(F_0,C_0)=E(F_0,C_0)/D(F_0,C_0).$$

The anticipated error rates table associated to transmission format $F_0$, designated by $p_A(F_0)$, is formed from the anticipated error rates $p_A(F_0,c)$ calculated for each of the values c considered for the instantaneous channel quality.

FIG. 2b represents a second preferred mode of implementation of step 30 of calculating the table of anticipated error rates, associated to transmission format $F_0$, in which the anticipated error rates are calculated based on at least one instantaneous channel quality variation model and instantaneous error rates.

As represented in FIG. 2b, according to this mode of implementation step 30 comprises sub-steps:
- 302 of calculating at least one instantaneous channel quality variation model,
- 303 of calculating instantaneous error rates,
- 304 of calculating anticipated error rates.

During sub-step 302 of calculating at least one instantaneous channel quality variation model, variations in the instantaneous channel quality during the loop time are calculated, by calculating the differences between the estimated values of the instantaneous channel quality for a plurality of data packets separated in time by said loop time.

For a first data packet received at a point in time (t−Δt), and a second data packet received at a point in time t, for which the estimated values of the instantaneous channel quality are respectively c(t−Δt) and c(t), the variation in said quality is designated by Δc(t−Δt). For example, in the case where the instantaneous channel quality is represented by a signal-to-noise ratio, expressed in decibels (dB), the variation Δc(t−Δt) can be expressed in the form:

$$\Delta c(t-\Delta t)=c(t-\Delta t)-c(t).$$

In a simple mode of implementation of step 30, a single instantaneous channel quality variation model can be determined, which will be used to calculate the anticipated error rates regardless of the value of the instantaneous channel quality.

In a particular mode of implementation, considered below, a plurality of such models, associated to different values of the instantaneous channel quality, are determined. This mode is advantageous insofar as it has been noted that, in practice, the variations in the channel can vary from one range of values of the instantaneous channel quality to the next.

In the case where a plurality of models are determined, the calculated variations are, for example, grouped together based on the previous value of the instantaneous channel quality, estimated for the first data packet. For example, all variation values Δc(t−Δt) calculated for a previous value c(t−Δt) of the instantaneous channel quality substantially equal to $C_0$ are grouped together. Next, an instantaneous channel quality variation model is established for each value considered for said instantaneous channel quality.

Examples are now described of the calculation for the variation model associated to a previous value $c(t-\Delta t)$ of the instantaneous channel quality substantially equal to $C_0$.

According to a first example, a cumulative counter is incremented for the number of data packets where the previous value $c(t-\Delta t)$ of the instantaneous channel quality is substantially equal to $C_0$.

For a given value of the variation in the instantaneous channel quality during the loop time, a cumulative counter is also incremented for the number of data packets. This counter is a total of those packets, among the packets whose previous value of the instantaneous channel quality was substantially equally to $C_0$, for which the estimated value of the variation in the instantaneous channel quality is substantially equal to said given value.

Preferably, there are different counters for each value $\Delta c$ of the variation in the channel for which a probability calculation is sought. For example, for a value $\Delta c_0$ of the variation in the instantaneous channel quality, the counters designated by $S_0(C_0)$, for the total number of packets received with a previous value $c(t-\Delta t)$ of the instantaneous channel quality substantially equal to $C_0$, and by $S_1(C_0, \Delta c_0)$, for the number of packets for which the variation value $\Delta c_0$ has been estimated, are incremented.

If it was estimated, for a data packet received at a point in time $(t-\Delta t)$, that the previous value $c(t-\Delta t)$ of the instantaneous channel quality was substantially equal to $C_0$, and that the value of the variation in the quality was substantially equal to $\Delta c_0$, counters $S_0(C_0)$ and $S_1(C_0, \Delta c_0)$ are incremented as follows:

$$S_0(C_0)=S_0(C_0)+1,$$

$$S_1(C_0,\Delta c_0)=S_1(C_0,\Delta c_0)+1.$$

The probability of having a value of the variation in the instantaneous channel quality substantially equal to $\Delta c_0$ when the previous value was equal to $C_0$, designated by $M(C_0, \Delta c_0)$, can thus be expressed in the form:

$$M(C_0,\Delta c_0)=S_1(C_0,\Delta c_0)/S_0(C_0).$$

The instantaneous channel quality variation model associated to value $C_0$ of the instantaneous channel quality, designated by $M(C_0)$, is formed from the probabilities $M(C_0, \Delta c)$ calculated for each of the values $\Delta c$ considered for the variation in the instantaneous channel quality.

According to another example, the variation in the instantaneous channel quality can be assumed to follow a Gaussian distribution and its mean and standard deviation can be estimated based on calculated variation values, utilizing methods known to the expert.

During sub-step 303, instantaneous error rates are calculated. An instantaneous error rate, associated to a given value of the instantaneous channel quality, is calculated directly for a plurality of data packets received with the given value of the instantaneous channel quality (unlike an anticipated error rate, which is calculated for a plurality of data packets received, relative to points in time when the estimated instantaneous channel quality value corresponded to said given value, after expiry of the loop time).

For a data packet received at a point in time t, one has the following information:
- $e(t)$: the estimated number of errors for said packet,
- $f(t)$: the transmission format used for said packet,
- $c(t-t)$: the estimated value, referred to as the "instantaneous value", of the instantaneous channel quality for said data packet.

For updating the threshold associated to transmission format $F_0$, only the data packets whose transmission format $f(t)$ is equal to $F_0$ are considered.

During sub-step 303, one increments, for example, cumulative counters for the number of data packets received and the number of errors estimated for said packets.

Preferably, there are different counters for each value of the instantaneous channel quality for which the calculation of an instantaneous error rate is sought. For example, for transmission format $F_0$ and a value $C_0$ of the instantaneous channel quality, counters designated by $D'(F_0, C_0)$, for the number of packets received, and $E'(F_0, C_0)$, for the estimated number of errors, are incremented.

In the case of a data packet error rate calculation: if a data packet, received at a point in time t, is formatted according to transmission format $F_0$, and the instantaneous value $c(t)$ of the instantaneous channel quality is substantially equal to $C_0$, counters $D'(F_0, C_0)$ and $E'(F_0, C_0)$ are incremented as follows:

$$D'(F_0,C_0)=D'(F_0,C_0)+1,$$

$$E'(F_0,C_0)=E'(F_0,C_0)+e(t).$$

In the case of a bit error rate calculation, the above equations become:

$$D'(F_0,C_0)=D'(F_0,C_0)+n(t),$$

$$E'(F_0,C_0)=E'(F_0,C_0)+e(t).$$

The instantaneous error rate for a value $C_0$ of the instantaneous channel quality and transmission format $F_0$, designated by $p_I(F_0, C_0)$, can be expressed in the form:

$$p_I(F_0,C_0)=E'(F_0,C_0)/D'(F_0,C_0).$$

The instantaneous error rates table associated to transmission format $F_0$, designated by $p_I(F_0)$, is formed from the instantaneous error rates $p_I(F_0, c)$ calculated for each of the values c considered of the instantaneous channel quality.

During sub-step 304 of calculating anticipated error rates, the instantaneous error rates are combined with the instantaneous channel quality variation models.

In order to determine the anticipated error rate associated to a previous value $C_0$ of the instantaneous channel quality, for transmission format $F_0$, designated by $p_A(F_0, C_0)$, the following expression can, for example, be calculated:

$$p_A(F_0,C_0)=\Sigma\Delta c\, p_I(F_0,C_0+\Delta c)\cdot M(C_0,\Delta c).$$

The variation model $M(C_0)$ allows probabilities $M(C_0, \Delta c)$ to be associated to possible values $(C_0+\Delta c)$ of the instantaneous channel quality after expiry of the anticipation period. The anticipated error rate $p_A(F_0, C_0)$ associated to value $C_0$ of the instantaneous channel quality is obtained by weighting the instantaneous error rates $p_I(F_0, C_0+\Delta c)$ by the probabilities $M(C_0, \Delta c)$ associated to said possible values.

The anticipated error rates table $p_A(F_0)$ associated to transmission format $F_0$ is formed from the anticipated error rates $p_A(F_0, c)$ calculated for each of the values c considered of the instantaneous channel quality.

Step 40 of updating thresholds is now described with reference to FIG. 3, in considering the non-limiting example where the transmission statistics calculated are error rates.

Figure 3:
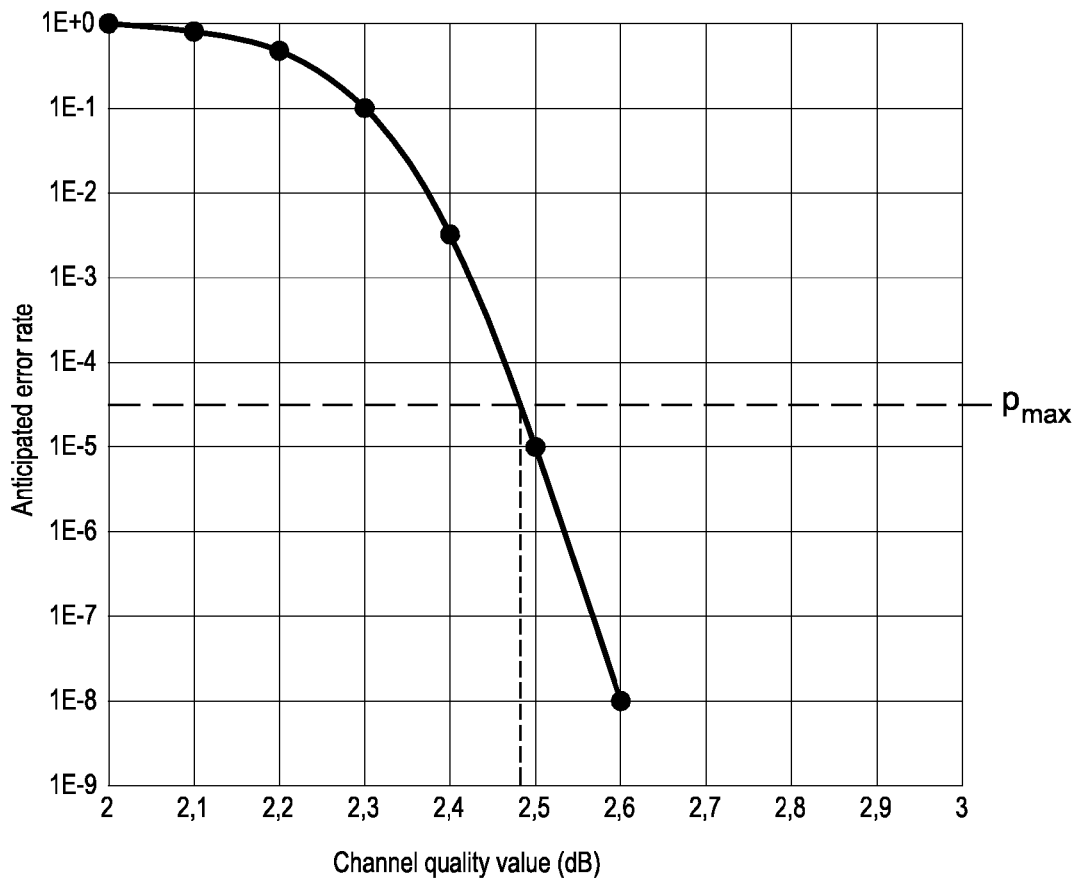
FIG. 3: an example illustrating the updating of a threshold based on a table of error rates.

FIG. 3 represents the anticipated error rates determined for transmission format $F_0$, for values of the instantaneous channel quality between 2 decibels (dB) and 2.6 dB, in 0.1 dB steps. In this figure, anticipated error rates above 2.6 dB are not shown because, for example, no error was detected for these values of the instantaneous channel quality. A maximum tolerated error rate $p_{max}(F_0)$ equal to 3E-05 is considered (designated by $p_{max}$ in FIG. 3). It is noted that an error rate 3E-05 is obtained for a channel quality value between 2.4 dB and 2.5 dB.

Preferably, the new value $S(F_0)$ of the threshold is determined as the value of the instantaneous channel quality for which there is an error rate equal to $p_{max}$, for example by interpolating the error rates from the table (determined in 0.1 dB steps). According to another non-limiting example, the new value $S(F_0)$ of the threshold is determined as the value of the channel quality associated to the calculated error rate immediately below $p_{max}$; in FIG. 3, this is equivalent to considering a new value $S(F_0)$ of the threshold of 2.5 dB.

More generally, the new value $S(F_0)$ of the threshold that must be updated is determined, in the case of transmission statistics representative of error rates, such that $p_A(F_0,S(F_0)) < p_{max}(F_0)$. It is noted that, in the case of transmission statistics representative of rates of packets or bits received without errors, the new value $S(F_0)$ of the threshold would be determined such that the rate of packets/bits received without errors, obtained for threshold $S(F_0)$, is equal to or greater than a minimum tolerated rate.

In other words, the new value $S(F_0)$ of the threshold is determined, according to the transmission statistics table, as a value enabling a predefined value of the transmission statistics to be provided.

At the beginning of the information collection, i.e. when there is no data packet exchange history and the counters are set to zero, the thresholds preferably have default values, for example predefined by the satellite telecommunications system operator. Default values are used while the number of data packets exchanged is insufficient to enable all or part of the thresholds to be updated. For example, such a number is considered sufficient when it is about a hundred or, for preference, about a thousand or more.

It is advantageous to force having information collected for a minimum number of data packets in order to improve the accuracy of the transmission statistics estimate.

While an insufficient number of data packets have been exchanged, preferably step 40 of updating the threshold of at least one transmission format is not executed. According to another example, said step is executed but the new value of an updated threshold corresponds to the default value while an insufficient number of data packets have been received and processed in step 30.

It should be noted that step 30 of calculating transmission statistics tables is preferably executed for each data packet received, i.e. each data packet received is taken into account in the statistics table calculation. The threshold updating step 40 can be executed with a lower frequency, defined for example as a number of packets received.

In addition, threshold updating step 40 can be executed independently for each transmission format. For example, as soon as a minimum number of data packets has been received for a given transmission format since the previous update of the associated threshold, update step 40 is executed for said transmission format.

According to a particular mode of implementation, compatible with the previous modes, execution of step 30 of calculating transmission statistics tables can be suspended temporarily. Nevertheless, a history of data packet exchanges between the transmitting device and the receiving device is kept. The history comprises information suitable for allowing calibration tables to be calculated taking into account data packets received previously by the receiving device. The history corresponds, for example, to the status of various cumulative counters, the numbers of errors estimated for data packets, the estimated values of the channel quality, etc.

Execution of step 30 may be resumed at any time and benefit from the history acquired prior to the suspension. The suspension/resumption of the execution of step 30 is advantageous in particular for excluding certain data packets from the transmission statistics calculation, for example data packets for which it is known beforehand that the estimated numbers of errors and/or the estimated values of the channel quality would be atypical.

According to a further particular mode of implementation, compatible with the previous modes, the transmission statistics calculation includes a forgetting factor, i.e. the errors estimated for data packets received recently by the receiving device are favored relative to errors estimated for older data packets.

This allows data packets that are too old, where the estimated numbers of errors would no longer be representative of the actual channel between the transmitting device and the receiving device, to be progressively forgotten.

In the case of the modes of implementation described in reference to FIGS. 2a and 2b, implementation of the forgetting factor consists, for example, of weighting cumulative counters incremented for calculating the error rates. The weighting is performed by multiplying counters by a positive real weighting factor $\alpha$ less than one. The weighting is performed for example each time the counters are incremented, or at regular intervals of time, etc.

In the case of counters $D(F_0,C_0)$ and $E(F_0,C_0)$ incremented for calculating the anticipated error rate associated to transmission format $F_0$ and the previous value $C_0$ of the instantaneous channel quality, the weighting is performed, for example, as follows:

$$D(F_0,C_0)=\alpha \cdot D(F_0,C_0),$$

$$E(F_0,C_0)=\alpha \cdot E(F_0,C_0).$$

According to a further particular mode of implementation, compatible with the previous modes, a rising threshold and a falling threshold are defined and updated for each transmission format. The rising threshold is used (during comparison step 20) when the value estimated (during estimation step 10) for the instantaneous channel quality is increasing, while the falling threshold is used when the value estimated for the instantaneous channel quality is decreasing. In the case where the transmission statistics are representative of error rates, the rising threshold is preferably greater than the falling threshold. This mode is advantageous because it makes it possible to avoid too frequent changes of transmission formats, which may occur in the case of an instantaneous channel quality fluctuating around a single threshold.

For example, the falling threshold is determined, as described above with reference to FIG. 3, so as to ensure an error rate less than or equal to a first maximum tolerated error rate. The rising threshold can be defined arbitrarily by adding a predefined margin to the defined falling threshold, e.g. a margin of 3 dB. Such a predefined margin can vary from one receiving device to another, one transmission format to another, etc. According to another non-limiting example, the rising threshold is determined as described above with reference to FIG. 3, so as to ensure an error rate less than or equal to a second maximum tolerated error rate; the second maximum tolerated error rate is less than the first maximum tolerated error rate.

Steps 30 and 40 of the calibration method are performed by the receiving device, or by both the receiving device and the transmitting device.

Transmission statistics table calculation step 30 is preferably performed by the receiving device. According to other examples, the receiving device determines information (numbers of errors, instantaneous channel quality, transmission formats, etc.) for data packets received and transmits said information to the transmitting device, which performs step 30.

Step 40 of updating the threshold of at least one transmission format is preferably performed by the receiving device. In this case, based on data packets it has received (corresponding to user data and/or learning sequences), the receiving device determines the thresholds to be considered for determining a transmission format that is suitable for the estimated value of the instantaneous channel quality and its potential variations during the loop time. The thresholds, after updating, are preferably communicated to the transmitting device, in particular if said transmitting device performs comparison step 20.

According to other examples, the update is performed by the transmitting device; in this case the receiving device communicates information allowing the transmitting device to update said thresholds, preferably the transmission statistics tables.

It should be noted that steps 30 and 40 of the method, which can be utilized by the transmitting device, can also be fully or partially utilized by a control device. According to another non-limiting example, the control device can utilize update step 40 based on information received for the receiving device; after updating the thresholds are then transmitted to the transmitting device.

Figure 4:
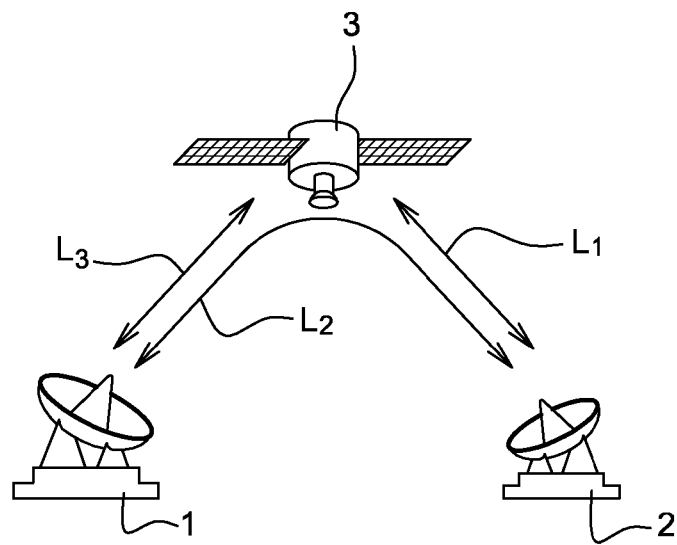
FIG. 4: a schematic representation of a satellite telecommunications system.

FIG. 4 represents a satellite telecommunications system comprising at least one ground station 1 (sometimes designated by "Gateway" or "Hub") and a plurality of terrestrial terminals 2, which exchange data packets via a satellite 3.

A terrestrial terminal 2 is mobile or stationary, and can be located anywhere in a coverage area of satellite 3, including in an aircraft (airplane, helicopter, etc.), in a boat, etc. A terrestrial terminal 2 can also be a relay station allowing data received from satellite 3 to be relayed to a plurality of other terrestrial terminals 2.

In the context of the invention, the transmitting device on the one hand and the receiving device on the other hand can respectively be the ground station 1 or a terrestrial terminal 2 or a satellite 3.

According to a first example, the transmitting device corresponds to satellite 3, and the receiving device corresponds to a terrestrial terminal 2. The channel between the satellite 3 and the terrestrial terminal 2 is designated by reference $L_1$ in FIG. 4. In this first example, the ground station 1 can in addition correspond to the control device.

According to another example, the transmitting device corresponds to the ground station 1 and the receiving device corresponds to a terrestrial terminal 2. The channel between the ground station 1 and the terrestrial terminal 2 is designated by reference $L_2$ in FIG. 4, and artificially covers satellite 3. This example corresponds to the case of a satellite 3 of the type called "passive" (or "relay"), which does not demodulate or decode the data packets received from the ground station 1 before encoding them and modulating them again to transmit them to the terrestrial terminal 2, but principally merely re-amplifies the data packets received from the ground station 1, and possibly translates their frequencies.

According to a further example, the transmitting device corresponds to the ground station 1 and the receiving device corresponds to satellite 3. The channel between the ground station 1 and the satellite 3 is designated by reference $L_3$ in FIG. 4. This example corresponds, for example, to the case of a satellite 3 of the type called "active" (or "regenerative"), which demodulates and decodes the data packets received from the ground station 1 before encoding them and modulating them again to transmit them to the terrestrial terminal 2.

Other examples are possible. In particular, channels $L_1$, $L_2$ and $L_3$ are preferably bidirectional, such that the roles of the transmitting device and the receiving device can also be reversed.

This invention also relates to a module for calibrating thresholds for selecting a transmission format for data packets to be exchanged between a transmitting device and a receiving device of a satellite telecommunications system.

The calibration module comprises means of calculating, for at least one transmission format, at least one transmission statistics table based on data packets received by the receiving device, and means of updating the threshold of said at least one transmission format.

Said means of calculating transmission statistics tables and updating thresholds are designed to respectively implement steps 30 of calculating transmission statistics tables and 40 of updating thresholds of the calibration method according to any of the modes of implementation described.

As previously described, said steps 30 of calculating transmission statistics tables and 40 of updating thresholds can be performed by the receiving device and/or the transmitting device, such that the threshold calibration module is intended to be embedded in a receiving or transmitting device, or to be distributed between a transmitting device and a receiving device.

When the threshold calibration module is intended to be distributed between a transmitting device and a receiving device, it is split into two sub-modules: a first sub-module, corresponding to the means of calculating transmission statistics, and a second sub-module, corresponding to the means of updating thresholds.

The threshold calibration module, in particular when it is intended to be embedded in a receiving device, or, where appropriate, the first sub-module, preferably comprises means of estimating errors for the data packets received by said receiving device, and means of estimating the instantaneous channel quality.

In a preferred embodiment, the threshold calibration module or, where appropriate, each of the sub-modules, comprises a central processing unit, e.g. a microprocessor, linked to a storage unit (magnetic hard disk, RAM and/or ROM memory, optical disk, etc.) by a communication bus.

A computer program product is stored in the central processing unit, in the form of a set of program code instructions to be executed by the central processing unit to perform the functions of the transmission statistics table calculation means, threshold update means, error estimation means and instantaneous channel quality estimation means.

According to certain embodiments, the threshold calibration module comprises electronic circuits, of ASIC, FPGA, etc. type, that can be configured by the central processing unit to perform all or part of the above-mentioned functions.

In particular, the threshold calibration module can comprise one or more time-shift registers for retarding the estimated values of the instantaneous channel quality, as described with reference to FIG. 2a for sub-step 300.

Preferably, the storage unit comprises a non-volatile memory in which the history of data packet exchanges between the transmitting device and the receiving device is stored. In this way, the threshold calibration module is designed to calculate calibration tables taking into account data packages received prior to said calibration module being powered off. Preferably, the history is stored in the form of the status of the various cumulative counters.

This invention also relates to a terrestrial terminal 2 having the threshold calibration module installed, a satellite 3 having said threshold calibration module installed, and a ground station 1 having said threshold calibration module installed.

This invention also relates to a satellite telecommunications system comprising at least one threshold calibration module according to the invention; the threshold calibration module is embedded in one of the following items of equipment, or distributed between two of the following items of equipment: a terrestrial terminal 2, a satellite 3, a ground station 1.

The invention claimed is:

1. A method, carried out by one or both of a transmitting device and a receiving device, for updating a threshold used for selecting a transmission format from a plurality of transmission formats associated with said threshold, a selected transmission format to be used by a transmitting device of a satellite telecommunications system to transmit data packets to the receiving device over a radio-frequency propagation channel, the transmission format associated to said threshold being selected when an estimated value of an instantaneous channel quality is higher than said threshold, said method comprising:

updating a table associating a plurality of transmission statistics to respective values of the instantaneous channel quality, said transmission statistics of the table being representative of an amount of estimated errors for a plurality of data packets, said table being updated from estimated errors in data packets that are received by the receiving device via the transmission format associated with the threshold to be updated; and from values of the instantaneous channel quality estimated during reception of said data packets received by the receiving device, updating the threshold to be, according to the updated table, a value of the instantaneous channel quality enabling a predefined value of the transmission statistics to be provided, wherein a satellite of the satellite telecommunications system is in a geostationary orbit, and the transmission statistics of the table are anticipated transmission statistics, and wherein each anticipated transmission statistic, associated to a given value of the instantaneous channel quality, being an expected transmission statistic for data packets that will be received, relative to a point in time when said given value of the instantaneous channel quality was estimated, after expiry of a period of time representative of the time period between a point in time when the instantaneous channel quality is estimated and a point in time when the transmission format, selected according to said estimated value of the instantaneous channel quality, is presented and applied to the receiving device.

2. The method according to claim 1, wherein the step of updating the table comprises sub-steps of:

time-shifting estimated values of the instantaneous channel quality so as to associate said estimated values of the channel quality to data packets received, relative to the points in time when said values of the instantaneous channel quality were estimated, after expiry of the period; and calculating anticipated transmission statistics based on estimated errors for data packets associated to said time-shifted values of the instantaneous channel quality.

3. The method according to claim 1, wherein the step of updating the table comprises sub-steps of:

calculating at least one instantaneous channel quality variation model, based on estimated values of the instantaneous channel quality;

calculating instantaneous transmission statistics based on estimated errors for data packets received by the receiving device, each instantaneous transmission statistic, associated to a given value of the instantaneous channel quality, being an expected transmission statistic for received data packets for which said given value of the instantaneous channel quality has been estimated; and calculating anticipated transmission statistics by combining at least one instantaneous channel quality variation model and instantaneous transmission statistics.

4. The method according to claim 1, wherein the transmission statistics are updated by including a forgetting factor, so as to favor errors estimated for the last data packets received by the receiving device.

5. The method according to claim 1, wherein, where there are several receiving devices, thresholds are updated independently for each of said receiving devices, by calculating at least one table per receiving device based on data packets received by that receiving device.

6. The method according to claim 1, wherein, during the step of updating the threshold, two thresholds associated with the selection of the same transmission format are updated, a first threshold to be utilized when the estimated value of the channel quality increases, and a second threshold to be utilized when the estimated value of the channel quality decreases.

7. A module for updating a threshold used for selecting a transmission format from a plurality of transmission formats associated with said threshold, a selected transmission format to be used by a transmitting device of a satellite telecommunications system to transmit data packets to a receiving device over a radio-frequency propagation channel, the transmission format from among the plurality of transmission formats being selected when an estimated value of an instantaneous channel quality is higher than said threshold, comprising:

means for updating a table associating a plurality of transmission statistics to respective values of the instantaneous channel quality, said transmission statistics of the table being representative of an amount of estimated errors for a plurality of data packets, said table being updated from estimated errors in data packets that are received by the receiving device via the transmission format associated with the threshold to be updated and from values of the instantaneous channel quality estimated during reception of said data packets received by the receiving device; and means for updating the threshold to be, according to the updated table, a value of the instantaneous channel quality enabling a predefined value of the transmission statistics to be provided, wherein a satellite of the satellite telecommunications system is in geostationary orbit, and the transmission statistics are anticipated transmission statistics, and wherein each anticipated transmission statistic, associated to a given value of the instantaneous channel quality, being an expected transmission statistic for data packets that will be received, relative to a point in time when said given value of the instantaneous channel quality was estimated, after expiry of a period representative of the time difference between a point in time when the instantaneous channel quality is estimated and a point in time when the transmission format, selected according to said estimated value of the instantaneous channel quality, is applied and presented to the receiving device.

8. The module according to claim 7, further comprising means for estimating errors in data packets received by the receiving device, and means for estimating the instantaneous channel quality.

9. The module according to claim 7, further comprising a non-volatile memory in which a history, determined according to the data packets received previously by the receiving device, is stored, the history being designed to allow the table to be updated taking said data packets previously received by the receiving device into account.

10. A terrestrial terminal of a satellite telecommunications system, comprising a threshold updating module according to claim 7.

11. A satellite of a satellite telecommunications system, comprising a threshold updating module according to claim 7.

12. A ground station of a satellite telecommunications system, comprising a threshold updating module according to claim 7.

13. A satellite telecommunications system comprising:
at least one threshold updating module according to claim 7, said threshold updating module is embedded in one of the following items of equipment, or distributed between two of said following items of equipment: a terrestrial terminal, a satellite, a ground station.

14. A method, carried out by one or both of a transmitting device and a receiving device, for updating a threshold for the selection of a transmission format from a plurality of transmission formats associated with said threshold, the transmission format selected being used by a transmitting device of a satellite telecommunications system to transmit data packets to a receiving device over a radio-frequency propagation channel, the transmission format associated to said threshold being selected when an estimated value of an instantaneous channel quality is higher than said threshold, said method comprising:
receiving data packets at the receiving device using a transmission format associated with the threshold;
updating a table associating a plurality of transmission statistics to respective values of the instantaneous channel quality, said transmission statistics of the table being based on i) an amount of estimated errors in said data packets received by the receiving device, and ii) the values of the instantaneous channel quality estimated during reception of said data packets; and
updating, from values of the instantaneous channel quality estimated during reception of said data packets received by the receiving device, the threshold by using the updated table, the updated threshold corresponding to a value of the instantaneous channel quality that enables a predefined value of the transmission statistics to be provided,
wherein the transmission statistics are anticipated transmission statistics and each anticipated transmission statistic, associated to a given value of the instantaneous channel quality, is a transmission statistic that is calculated for data packets received, relative to a point in time when said given value of the instantaneous channel quality is estimated, after expiry of an anticipation period representative of a loop time between the point in time when the instantaneous channel quality is estimated and a point in time when the transmission format, selected on the basis of said estimated value, will be applied and presented to the receiver.

* * * * *